United States Patent [19]

Fujita

[11] Patent Number: 5,001,943
[45] Date of Patent: Mar. 26, 1991

[54] SLIPPAGE PREVENTING APPARATUS FOR A VEHICLE WITH AN AUTOMATIC TRANSMISSION

[75] Inventor: Nagahisa Fujita, Hiroshima, Japan
[73] Assignee: Mazda Motor Corporation, Hiroshima, Japan
[21] Appl. No.: 396,800
[22] Filed: Aug. 21, 1989

Related U.S. Application Data

[63] Continuation of Ser. No. 224,695, Jul. 27, 1988, abandoned.

[30] Foreign Application Priority Data

Jul. 30, 1987 [JP] Japan ................................ 62-188828

[51] Int. Cl.$^5$ .............................................. F16H 59/66
[52] U.S. Cl. .................................. 74/866; 364/426.02
[58] Field of Search ................. 180/197; 74/866, 857, 74/858, 856, 859, 862, 878; 364/424.1, 426.02, 426.03; 303/100

[56] References Cited

U.S. PATENT DOCUMENTS

| | | | |
|---|---|---|---|
| 3,938,611 | 2/1976 | Bertolasi | 180/197 |
| 4,499,542 | 2/1985 | Hamajima et al. | 74/866 X |
| 4,703,823 | 11/1987 | Yogo et al. | 364/426.03 X |
| 4,721,176 | 1/1988 | Kabasin et al. | 180/197 |
| 4,732,055 | 3/1988 | Tateno et al. | 364/424.1 X |
| 4,760,893 | 8/1988 | Sigl et al. | 364/426.03 X |
| 4,762,196 | 8/1988 | Harada et al. | 180/197 |
| 4,771,850 | 9/1988 | Matsuda et al. | 180/197 |
| 4,779,696 | 10/1988 | Harada et al. | 180/197 |
| 4,788,892 | 12/1988 | Komoda et al. | 74/878 X |
| 4,829,852 | 5/1989 | Sakakigama | 74/878 X |
| 4,858,498 | 8/1989 | Bouda | 74/878 X |
| 4,866,623 | 9/1989 | Ise et al. | 364/426.03 |
| 4,933,857 | 6/1990 | Hashiguchi et al. | 364/426.02 |

FOREIGN PATENT DOCUMENTS

| | | | |
|---|---|---|---|
| 0029026 | 4/1977 | Japan | 180/197 |
| 0106160 | 5/1987 | Japan | 74/866 |
| 81/03152 | 7/1980 | PCT Int'l Appl. | |

Primary Examiner—Allan D. Herrmann
Assistant Examiner—Khoi Q. Ta
Attorney, Agent, or Firm—Fish & Richardson

[57] ABSTRACT

The output of the engine is reduced by the slip control as a degree of slippage of the driven wheels on pavement gets larger. Upon the slip control, the shift control of the automatic transmission is brought into a state in which the speed stages are unlikely to be shifted.

46 Claims, 13 Drawing Sheets

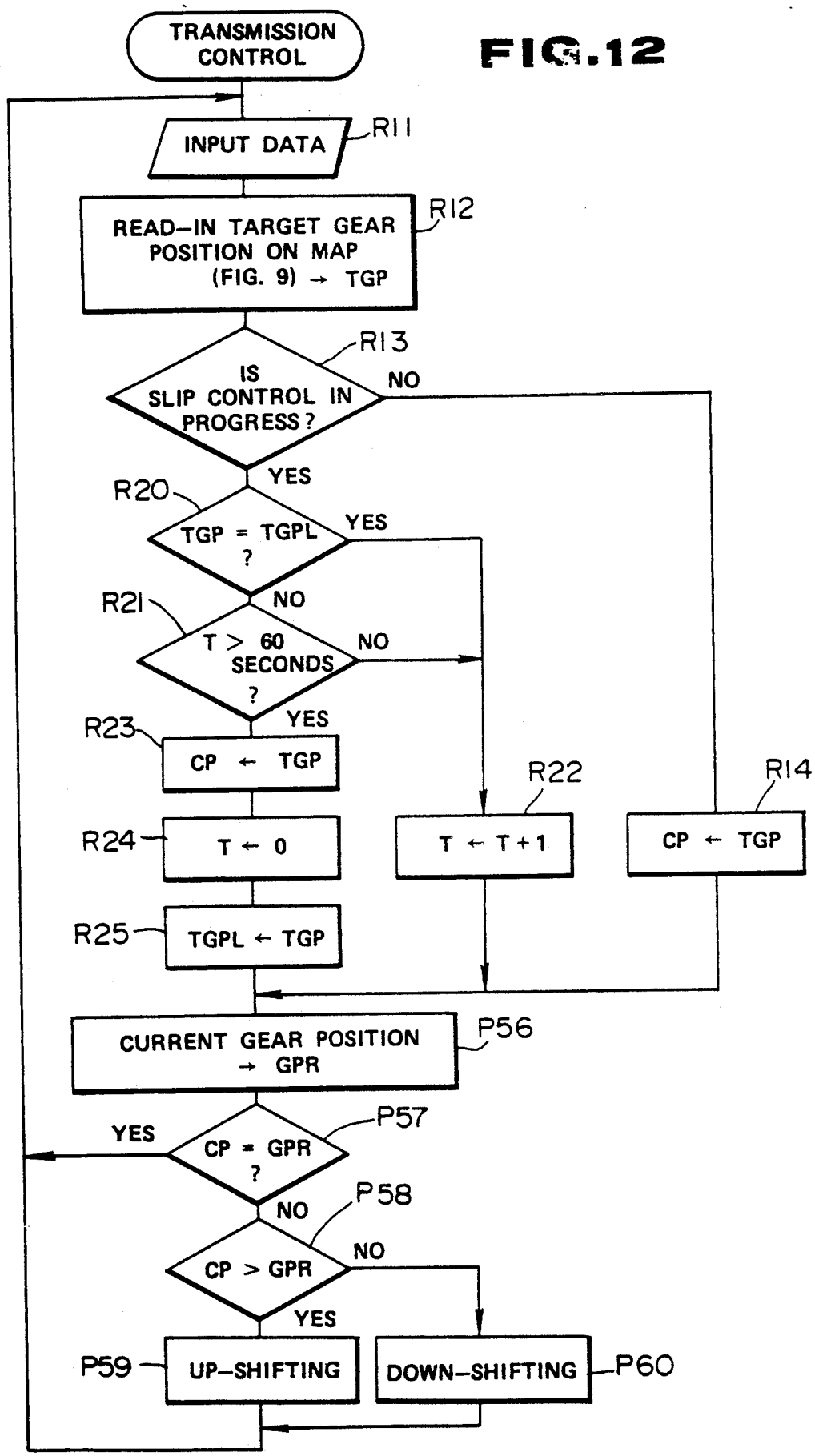

SLIPPAGE PREVENTING APPARATUS FOR A VEHICLE WITH AN AUTOMATIC TRANSMISSION

This application is a continuation of U.S. application Ser. No. 224,695, filed July 27, 1988, now abandoned.

BACKGROUND OF THE INVENTION

1. Field of the Invention

The present invention relates to a slippage preventing apparatus for a vehicle with an automatic transmission.

2. Description of Related Art

Prevention of a large degree of slippage of the driven wheels on pavement permits an effective provision of an impellent force with the vehicle and is effective from a standpoint of safety in order to prevent the spinning of the vehicle. It is known that an increase in an amount of slippage of the driven wheel may be prevented by decreasing a torque to be applied to the driven wheels, which may cause slippage.

Japanese Patent Publication (laid-open) Nos. 16,948/1983 and 56,662/1985 disclose a slip control in which a torque to the driven wheels is decreased by applying a braking force to the driven wheels through the brake and by decreasing a torque output from the engine. More specifically, Japanese Patent Publication (laid-open) No. 16,948/1983 is directed to such a slip control as solely braking the driven wheels, on the one hand, when a degree of slippage is smaller, and as additionally decreasing the torque output from the engine, on the other hand, when a degree of slippage becomes larger. Japanese Patent Publication (laid-open) No. 56,662/1985 is directed to a slip control technology such that, when one of the left-hand and right-hand driven wheels slips to a larger degree than the other, only the one driven wheel is braked and, when the left-hand and right-hand driven wheels both slip to a greater degree, an output torque from the engine is reduced in addition to the braking against the driven wheels.

An increasing number of automobiles are equipped with an automatic transmission of the multispeed stage type that is designed to transmit an output of the engine to the driven wheels. Such an automatic transmission can automatically shift speed stages on the basis of shift characteristics which have been set in advance, for example, those set using a vehicle speed and a degree of throttle opening as parameters.

A vehicle equipped with such an automatic transmission may be constructed such that the speed stages are shifted upon the slip control. More specifically, in instances where the output of the engine is adjusted during operation of the slip control, the speed stages may be likely to be shifted as a throttle opening associated varies with the slip control if a factor such as, for example, a throttle opening, related to the engine output would be used as a parameter for shift characteristics. And the speed stages may be likely to be further shifted by the slip control against the driven wheels by means of an alteration in torques to be applied to the driven wheels involved in the shift of speed stages. Thus, for a vehicle with an automatic transmission, it may be likely to cause the upshifting and downshifting to be frequently repeated by means of an interaction between the slip control and the shift of the speed stages.

SUMMARY OF THE INVENTION

Therefore, the present invention has the object to provide a slippage preventing apparatus for a vehicle with an automatic transmission, adapted to allow the undesirable shift of speed stages involved upon the slip control to be controlled.

In one aspect the present invention consists of a slippage preventing apparatus for a vehicle with an automatic transmission, adapted to allow output of the engine to be transmitted to the driven wheel through the automatic transmission, which comprises output adjusting means for adjusting the output of the engine; slip amount detecting means for detecting a slip amount or an amount of slippage of the driven wheel on pavement; accelerator amount detecting means for detecting an accelerator amount or an amount of operation of the accelerator; basic output adjusting means for adjusting the output adjusting means on the basis of the accelerator amount in response to an output from the accelerator amount detecting means; output controlling means for slip control adapted to reduce the output of the engine by controlling the output adjusting means prior to the basic output adjusting means in response to an output from the slip amount detecting means when a large degree of slippage occurs on the driven wheel; and shift controlling means adapted to control the shift of the automatic transmission so as to cause the shift unlikely to occur upon the slip control when the slip control is implemented by the output controlling means for the slip control.

The arrangement permits a prevention of an interaction of the slip control with the shift of speed stages in order to control the automatic transmission so as to be unlikely to shift the speed stages during the slip control.

The slippage preventing apparatus may contain a transmission control means, firstly, which may comprise a first shift characteristic for ordinary drive operation, viz., for driving under ordinary conditions, without the slip control, and a second shift characteristic for the slip control. As the second shift characteristic, a vehicle speed may be set as a sole parameter, thus enabling the slip control to exert no adverse influence at all upon a variation in the engine output. As the first shift characteristic may be used one of conventional type as a parameter, such as an opening degree of the throttle valve (hereinafter will be referred to as a throttle opening), which may shift the speed stages in accordance with an engine output.

The transmission control means may also comprise a system which fixes a speed stage at a particular position, for example, at the 2nd speed stage, during the slip control, thereby preventing the slip control from interacting with the shift of speed stages. It may further comprise only one shift characteristic of the type unlikely to cause the shift of the speed stages in accordance with a variation in the engine output. Such a shift characteristic may use, for example, and opening degree of an accelerator (hereinafter will be referred to as an accelerator opening) or a vehicle speed as a parameter. In other words, the accelerator opening does not virtually vary as the engine output is changed by the slip control, so that the shift of the speed stages which may arise upon the slip control can be prevented. It is further noted that the use of the accelerator opening as a parameter can shift the speed stages in response to requirements for acceleration or deceleration by the driver.

The above and other objects, features and advantages of the present invention will become apparent from the description of preferred embodiments which will be hereinafter described in detail with reference to the accompanying drawings.

BRIEF DESCRIPTION OF THE DRAWINGS

FIGS. 12 and 14 each is a flowchart showing other examples of shift control according to the present invention.

DETAILED DESCRIPTION OF THE PREFERRED EMBODIMENTS

The present invention will be described by way of examples in conjunction with the drawings attached hereto.

In the following embodiment, it is to be understood that a slippage of the driven wheel or wheels is controlled in such two ways as decreasing a torque to be generated by the engine and applying a braking force from the brake.

Outline of Overall Construction

Figure 1:
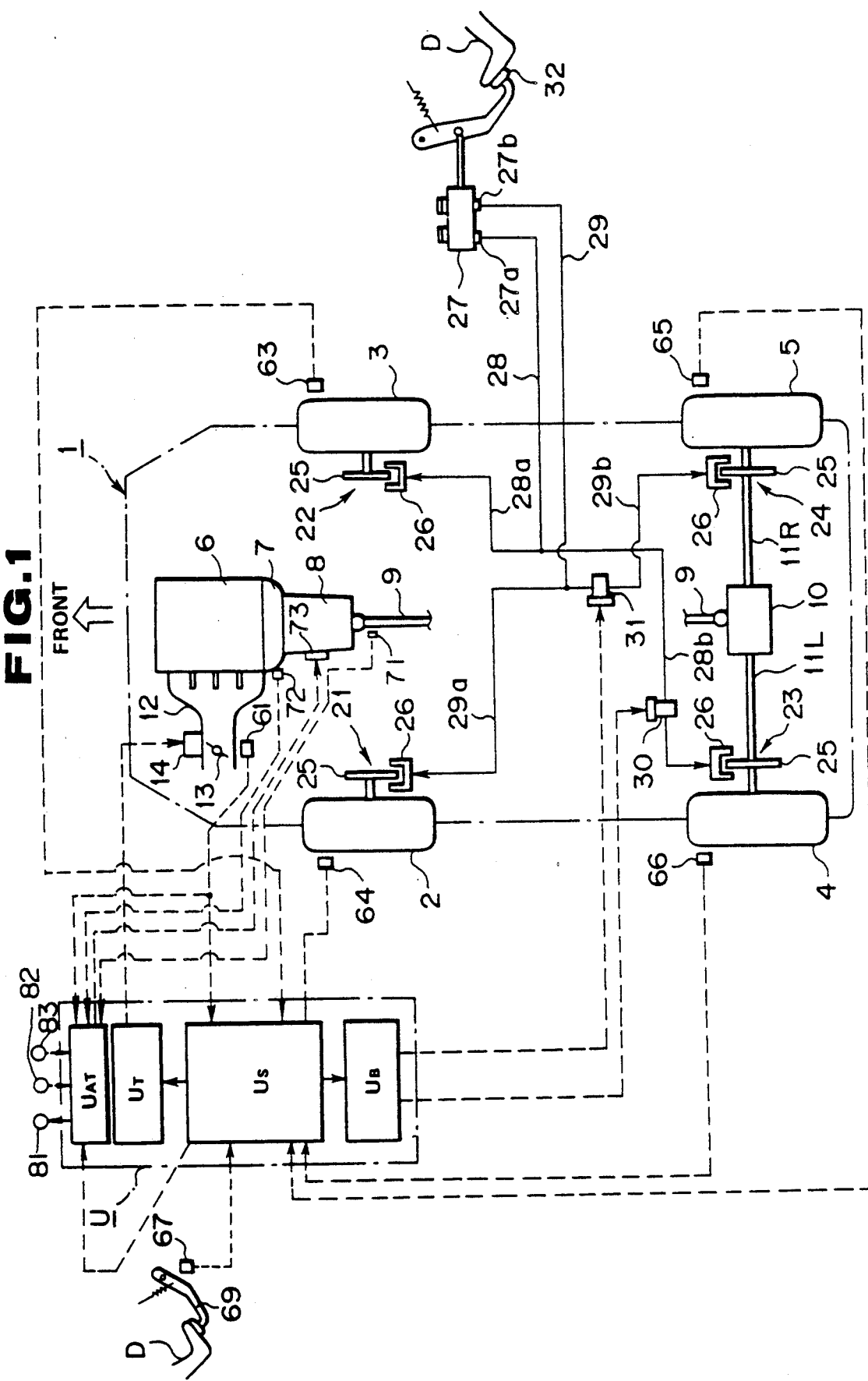
FIG. 1 is a diagram showing one example of the slippage preventing apparatus according to the present invention.

In FIG. 1, an automobile 1 comprises left-hand and right-hand undriven front wheels 2 and 3 and left-hand and right-hand driven rear wheels 4 and 5, respectively. In this embodiment, the automobile 1 is of the FR (front engine rear wheel drive) type in which an engine 6 as a source of power is mounted in a forward portion thereof and an output or torque generated by the engine 6 is transmitted through a clutch 7, an automatic transmission 8 having forward three speed stages, a propeller shaft 9, a differential gear 10 and left-hand and right-hand drive shafts 11L and 11R to the respective left-hand and right-hand driven rear wheels 4 and 5.

The engine 6 is designed to implement the load control, that is, a control of the output torque, by a throttle valve 13 mounted on an intake air passage 12. More specifically, the engine 6 is a gasoline engine of the type that the output torque varies with an amount of intake air. The amount of the intake air may be controlled by the throttle valve 13 that is electromagnetically opened or closed by a throttle actuator 14. Although a stepping motor is used as the throttle actuator 14 in this embodiment, there may be employed an appropriate means that may be electromagnetically controlled by a DC motor or by fluid pressures such as hydraulic pressures.

The wheels 2 to 5 are provided with a brake 21, 22, 23 and 24, respectively, and the brakes 21 to 24 may be each a disk brake. As is known, the disk brake comprises a disk 25 rotatable with the corresponding wheel and a caliper 26. The caliper 26 is provided with a brake pad and a wheel cylinder, and the brake pad depresses the disk 5 by a braking force corresponding to an amount of a braking liquid pressure supplied to the wheel cylinder.

A master cylinder 27 functioning as a source of generating the braking liquid pressure may be of the tandem type having two discharge outlets 27a and 27b. A brake pipe 28 extending from the discharge outlet 27a is branched at its middle portion along the line into branch pipes 28a and 28b, the branch pipe 28a being connected to the wheel cylinder of the brake 22 for the right-hand front wheel 3 and the branch pipe 28b being connected to the wheel cylinder of the brake 23 for the left-hand rear wheel 4. A brake pipe 29 extending from the discharge outlet 27b is branched at its middle portion along the line into branch pipes 29a and 29b, the branch pipe 29a being connected to the wheel cylinder of the brake 21 for the left-hand front wheel 2 and the branch pipe 29b being connected to that of the brake 24 for the right-hand rear wheel 5. As described hereinabove, the brake pipe system may be of a so-called 2-system X type. To the branch pipes 28a and 29a for the respective brakes 23 and 24 of the driven rear wheels 4 and 5 are connected, respectively, hydraulic pressure control valves 30 and 31 of the electromagnetic type as means for controlling a braking force. The braking liquid pressure generated by the master cylinder 27 corresponds to an amount or force of a brake pedal 32 stepped down by the operator D.

Braking Pressure Regulating Circuit

Figure 2:
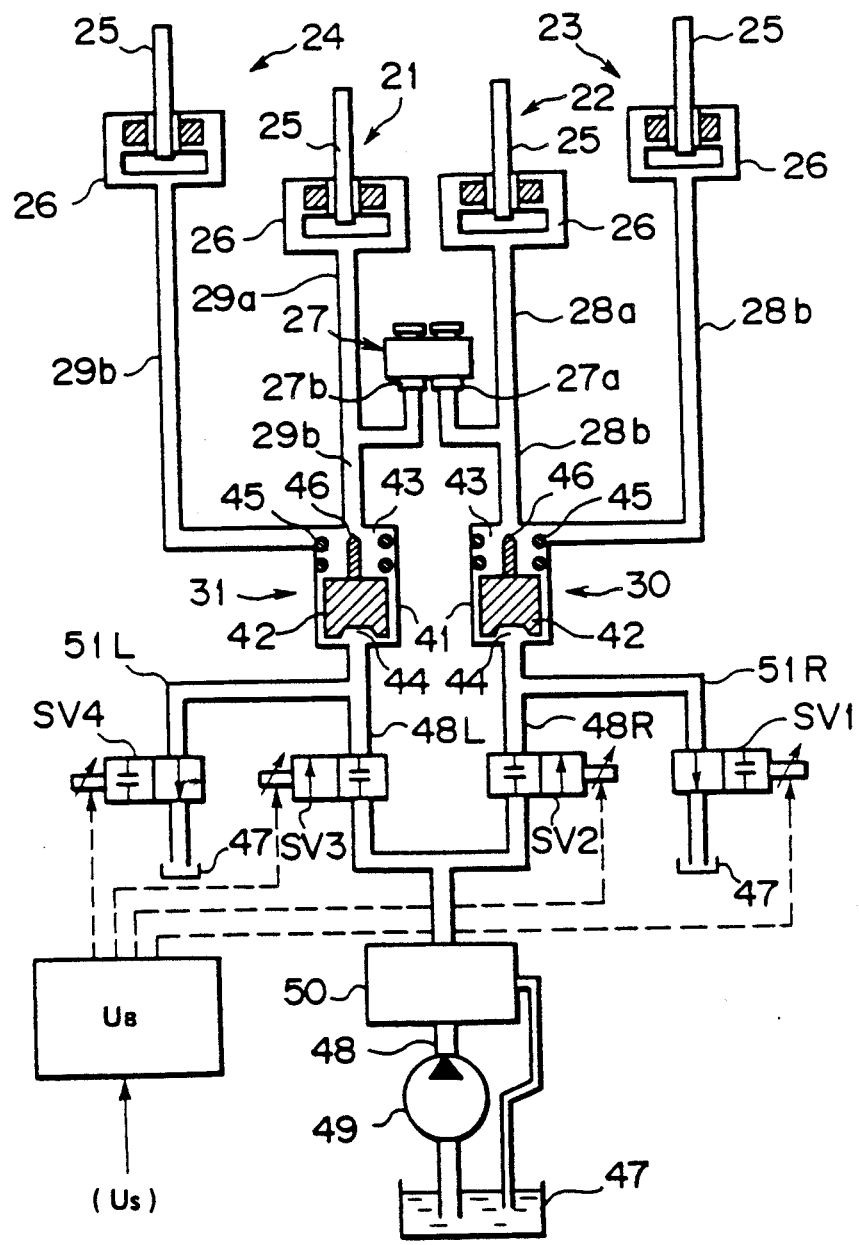
FIG. 2 is a diagram showing one example of a braking liquid pressure control circuit.

As shown specifically in FIG. 2, the liquid pressure control valves 30 and 31 are provided each with a cylinder 41 and a piston 42 inserted slidably in the cylinder 41. The piston 42 divides the cylinder 41 into and defines a volume-variable chamber 43 and a control chamber 44. The volume-variable chambers 43 of the liquid pressure control valves 30 and 31 work as a passage of the braking liquid pressure to the brakes 23 and 24 from the master cylinder 27, respectively. Accordingly, the volume of the volume-variable chamber 43 can be varied by adjusting a position of displacement of the piston 42, thereby generating the braking liquid pressure to the brakes 23 and 24 and at the same time increasing, decreasing or retaining the braking liquid pressure generated.

The piston 42 is constantly actuated by a return spring 45 so as to cause the volume in the volume-variable chamber 43 to be increased. The piston 42 is integrated with a check valve 46 that in turn is designed to close its inlet side to the volume-variable chamber 43 when the piston 42 is displaced in such a manner that the volume in the volume-variable chamber 43 is decreased. This arrangement allows the braking liquid pressure generated in the volume-variable chamber 43 to work only on the brakes 23 and 24 for the driven rear wheels 4 and 5 and not to act on the brakes 21 and 22 for the undriven front wheels 2 and 3, respectively.

The position of displacement of the piston 42 is adjusted by regulation of the hydraulic pressure against the control chamber 44. More specifically, a supply pipe 48 extending from a reservoir 47 is branched at a middle portion thereof along the line into two branch pipes 48L and 48R, the branch pipe 48R being connected to the control chamber 44 for the valve 30 and the other branch pipe 48L being connected to the control chamber 44 for the valve 31. To the supply pipe 48 are connected a pump 49 and a relief valve 50. To the branch pipes 48L and 48R are connected supply valves SV3 and SV2, respectively, each consisting of an electromagnetically opening or closing valve. The control chambers 44 are additionally connected to the reservoir 47 through discharge piped 51L and 51R, to which discharge valve SV1 and SV4, respectively, each consisting of an electromagnetically opening or closing valve, are connected.

When the braking is effected using the hydraulic pressure regulating valve 30 or 31 or during the slip control, on the one hand, the check valve 46 acts in such a manner that the brake does not basically work by means of operation of the brake pedal 32. When the braking liquid pressure to be generated by the hydraulic pressure regulating valve 30 or 31 is small or when the pressure is being decreased, on the other hand, the brake is allowed to work as the brake pedal 32 is stepped down. When no braking liquid pressure for the slip control is generated by the hydraulic pressure regulating valves 30 and 31, the usual braking action that arises from operation of the brake pedal 27 is caused to work because the master cylinder 27 is allowed to be communicated with the brakes 23 and 24.

A control of each of the valves SV1 to SV4, inclusive, is implemented by opening or closing by a brake control unit $U_B$ as will be described more in detail below. The table below demonstrates relationships of a state of the braking liquid pressure against the brakes 23 and 24 with operation of each of the valves SV1 to SV4, inclusive.

TABLE

| Brakes | Pressure | VALVES | | | |
|---|---|---|---|---|---|
| | | SV1 | SV2 | SV3 | SV4 |
| 24 | Increase | — | — | Opened | Closed |
| | Decrease | — | — | Closed | Opened |
| | Retain | — | — | Closed | Closed |
| 23 | Increase | Closed | Opened | — | — |
| | Decrease | Opened | Closed | — | — |
| | Retain | Closed | Closed | — | — |

Outline of Control Units

Referring to FIG. 1, reference symbol U denotes generally a control unit group that consists roughly of a brake control unit $U_B$, a throttle control unit $U_T$, a slip control unit $U_S$ and a control unit $U_{AT}$ for shift control. The brake control unit $U_B$ is designed so as to control the opening or closing of each of the valves SV1 to SV4, inclusive, as have been described above, on the basis of signals from the slip control unit $U_S$. The throttle control unit $U_T$ is to control the driving of the throttle actuator 14 on the basis of signals from the slip control unit $U_S$.

The slip control unit $U_S$ comprises a computer of the digital type such as a microcomputer. To the slip control unit $U_S$ are given signals output from each of sensors (or switches) 61 and 63 to 67, inclusive. The sensor 61 is to detect a degree of opening of the throttle valve 13. The sensors 63 and 64 are to detect rotational speeds of the respective left-hand and right-hand undriven front wheels 2 and 3, or a vehicle speed, and the sensors 65 and 66 are to detect rotational speeds of the respective left-hand and right-hand driven rear wheels 4 and 5.

The sensor 67 is to detect an amount of operation of an accelerator 69, that is, a degree of accelerator opening.

The control unit $U_S$ is designed to give an output to the control unit $U_{AT}$ for the shift control in such a manner, for example, that a "High" signal is produced when the slip control is implemented and a "Low" signal is produced when no slip control is under way. The control unit $U_{AT}$ may comprise a microcomputer. Into the control unit $U_{AT}$ are input a signal of a throttle opening from the sensor 61, a signal of the rotational number of the output shaft of the automatic transmission 8, i.e., a vehicle speed, from the sensor 71, a signal of a current gear position (shifting speed stages) of the automatic transmission 8 from the sensor 72, and a signal of implementation of or failure to implement the slip control from the control unit $U_S$. The control unit $U_{AT}$ gives a shift solenoid 73 of the automatic transmission A a shift signal for providing a predetermined speed stage and, in this embodiment, the control unit $U_{AT}$ stores two shift characteristics, one being used during operation of the slip control only and the other being used during ordinary drive operation. The two shift characteristics are slected in accordance of absence or presence of the slip control.

The slip control units $U_S$ and $U_{AT}$ basically comprises a CPU, ROM, RAM, and CLOCK. It is further provided with input and output interface as well as A/D or D/A converters in accordance with input or output signals. These are the same as a conventional one where a microcomputer is employed so that detailed description thereon will be omitted herein for the brevity of description.

The control manner of the control unit group U will be described in the order as have been described hereinabove. It is noted that the driving force generally becomes the maximum in instances where a slip ratio S ranges from about 1.04 to 1.1. The slip ratio or amount S for the driven wheels may be defined by the following relationship (1):

$$S = \frac{WD}{WL} \quad (1)$$

where
WD is an average of rotations of the left-hand and right-hand driven wheels 4 and 5; and
WL is an average of rotations of the left-hand and right-hand undriven wheels 2 and 3 (a vehicle speed).

Throttle Control

Figure 8:
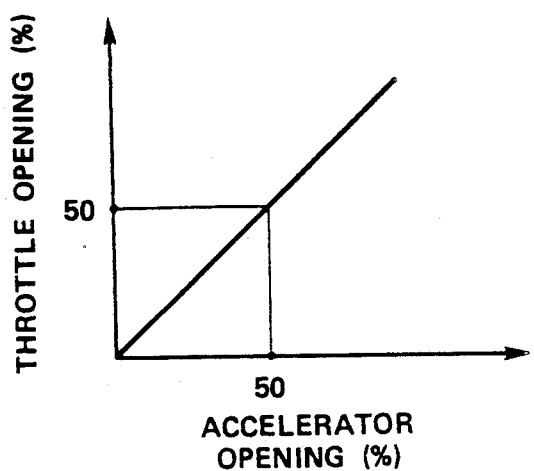
FIG. 8 is a graph showing an example of the relationship of accelerator openings vs. throttle openings at the time when no slip control is under way.
Figure 11:
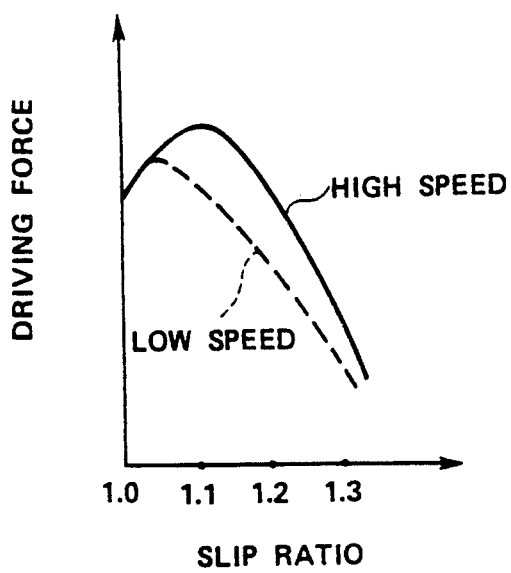
FIG. 11 is a graph showing the relationship of driving forces vs. slip ratios.

The throttle control unit $U_T$ is designed to establish a feedback of the throttle actuator 14 for the throttle valve 13 so as to give a target throttle opening. When no slip control is implemented during the throttle control, the target throttle opening is regulated so as to be proportional by a 1-to-1 ratio to an amount of operation of the accelerator 69 operated by the operator D. One example of the relationship of the throttle opening with the accelerator opening at this time is shown in FIG. 8. It is also noted herein that the throttle control unit $U_T$ is designed to implement the throttle control in such a manner that a target throttle opening Tn operated by the slip control unit $U_S$ is given at the time of the slip control without following the characteristics as demonstrated in FIG. 8.

The feedback of the throttle valve 13 using the throttle control unit $U_T$ is established in this embodiment by way of the PI-PD control so as to compensate for a variation in response speeds of the engine 6. More specifically, the opening of the throttle valve 13 is subjected to the PI-PD control during the slip control for the driven wheels in such a manner that the current slip value calculated by the above formula (1) corresponds with the target slip value. In other words, as will be apparent from the above formula (1), the throttle opening of the throttle valve 13 is controlled to satisfy the following relationship (2):

$$WET = WL \times ST \tag{2}$$

where
WET is a driven wheel target rotational number; and
ST is a target slip value.

Brake Control

During the time of the slip control, a feedback of the left-hand and right-hand driven wheels 4 and 5 is established using the control unit $U_B$ so as to allow their respective rotations or slippage to separately become a predetermined target slip value ST. It is possible that this slip value becomes a value different from the target slip value ST for the engine. In other words, the brake control is implemented by way of the feedback control such that a driven wheel rotational number WBT is determined by the following relationship (3):

$$WBT = WL \times ST \tag{3}$$

It is to be understood here that the driven wheel rotational number WBT in the formula (3) contains a correction in accordance with the steered angle of the steering wheel as the target driven wheel rotational speed WET in the formula (2) above.

In this embodiment, the feedback is established by means of the I-PD control so as to satisfy the relationship as shown in the above formula (3). More specifically, an amount of operation of the brake Bn—an amount of operation of the piston 44 in the valve 30 or 31—is subjected to the I-PD operation. It is noted that the braking liquid pressure is decreased when the operation amount of the brake Bn is larger than zero, viz., when it is positive, on the one hand, and the braking liquid pressure is increased when the operation amount of the brake Bn is equal to or lower than zero, on the other hand. The braking liquid pressure is increased or decreased by opening or closing the valves SV1 through SV4 as have been described above. Speeds of increasing or decreasing the braking liquid pressures are adjusted by ratios of the opening time to the closing time (duty ratios) of the valves SV1 to SV4, inclusive, that is, by means of the duty control. It is further noted herein that the duty control is conducted so as to be proportional to the absolute value of the operation amount of the brake Bn given by the relationship (3) above. Accordingly, the absolute value of the brake operation amount Bn leads to a proportion to a speed of a variation in the braking liquid pressures. On the contrary, the duty ratio determining the speed of increasing or decreasing the braking liquid pressures indicates the brake operation amount Bn.

Shift Control

Figure 9:
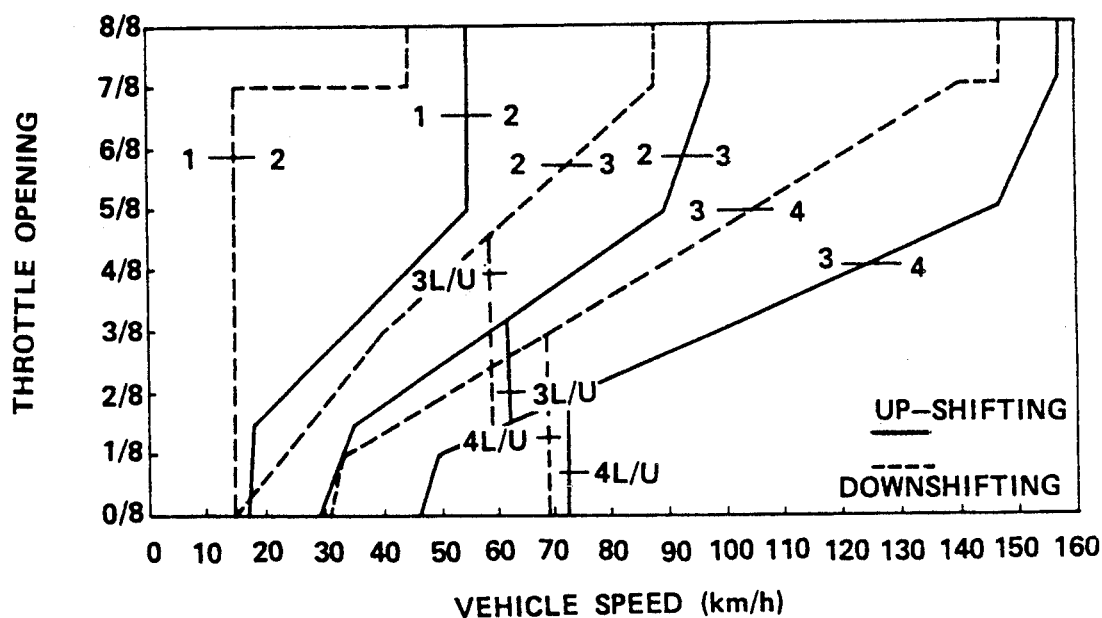
FIG. 9 is a graph showing one example of shift characteristics for ordinary drive operation.
Figure 10:
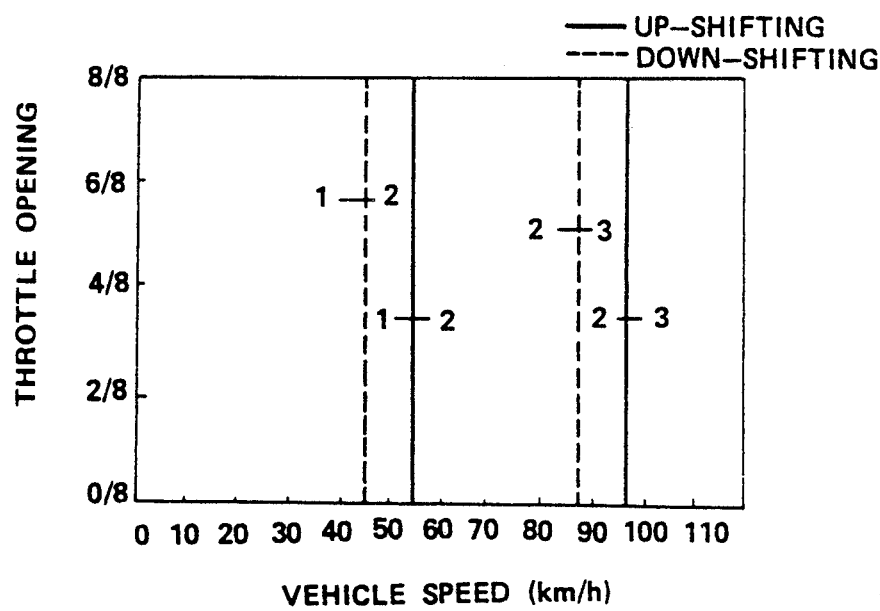
FIG. 10 is a graph showing one example of shift characteristics for the slip control.

The control unit $U_{AT}$ for the shift control stores the first shift characteristic as shown in FIG. 9 and the second shift characteristic as shown in FIG. 10. The first shift characteristic contains upshifting and downshifting characteristic lines using a throttle opening and a vehicle speed as parameters, as have generally been used in conventional manner. The second shift characteristic contains upshifting and downshifting characteristic lines using a vehicle speed only as a parameter. The first shift characteristic as shown in FIG. 9 is selected to carry out the shift control upon driving under ordinary conditions while the second shift characteristic as shown in FIG. 10 is selected for the shift control during the slip control.

One example of the slip control according to the present invention will be described below in conjunction with the flowcharts attached hereto.

Figure 3:
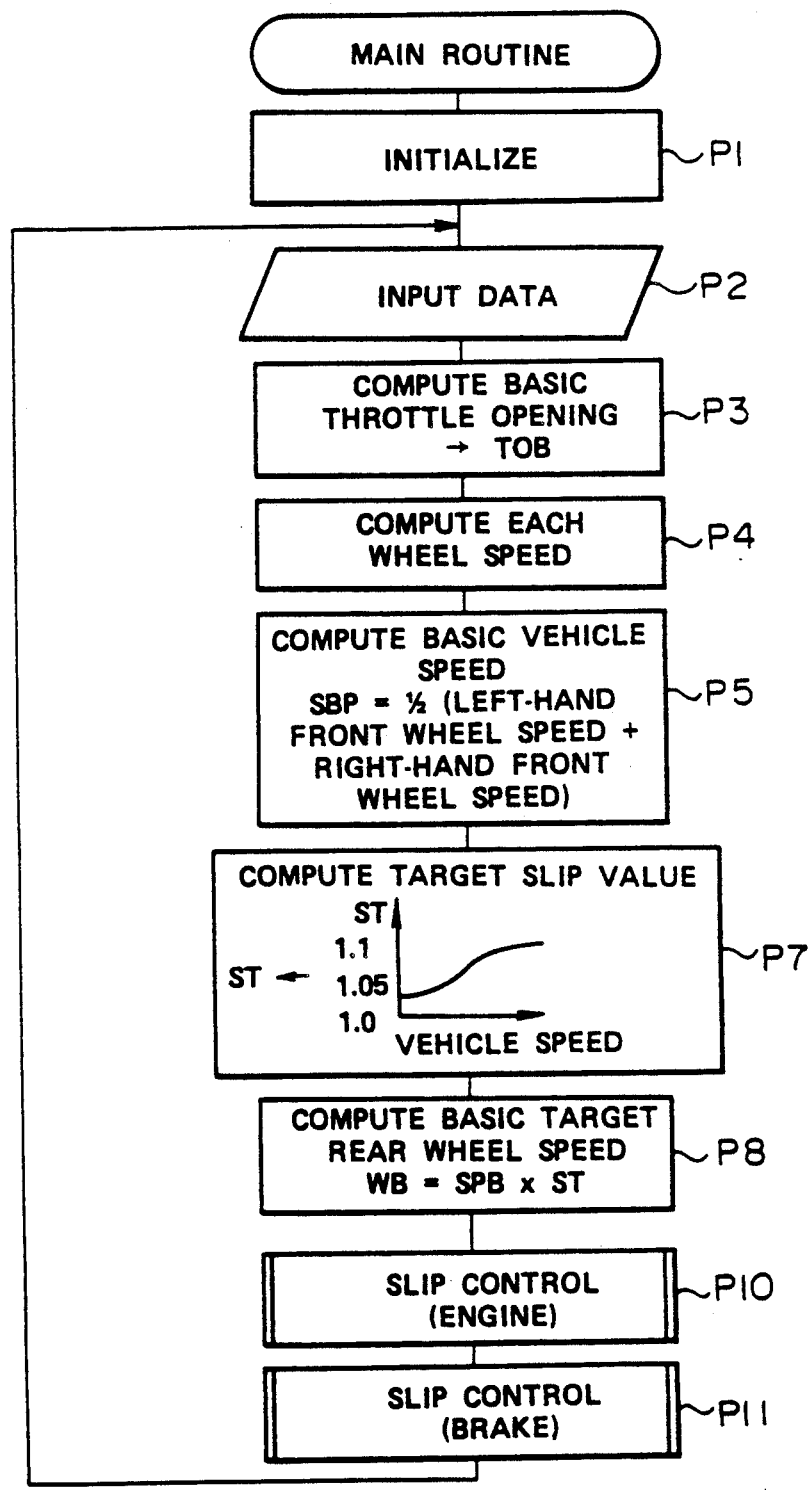
FIGS. 3 through 7 are flowcharts each showing a control manner according to the present invention.

FIG. 3 (Main Routine)

As the key switch and the starter switch are turned on to thereby start the engine 6, the process is started from the step P1. At step P1, the overall system is initialized. At step P2, an output from each of the sensors 61, and 63 through 67 are read in. At step P3, a basic throttle opening TOB is computed from a map, as shown in FIG. 8, on the basis of the read-in data in accordance with an accelerator opening and, at step P4, a rotational speed of each of wheels 2 through 5 is computed. Then, at step P5, an average rotational speed SPB of the undriven wheels 2 and 3 is computed by adding the rotational speed of the left-hand undriven wheel 2 to that of the right-hand undriven wheel 3 and then dividing the sum by 2.

After the step P5, the target slip value ST for the driven wheels is decided at step P7 by the basic vehicle speed SPB calculated in step P5. This decision is made on the basis of a map (not shown) prepared and stored in advance in such a manner that the target slip value ST for the driven wheel gets larger continuously as the basic vehicle speed SPB gets faster.

Step P8 computes a basic target driven wheel rotational speed WB by multiplying the basic vehicle speed SPB by the target slip value ST computed at the step P7.

The flow then proceeds to step P10 for the slip control by the engine and step P11 for the slip control by the brake, as will be described more in detail.

Figure 4:
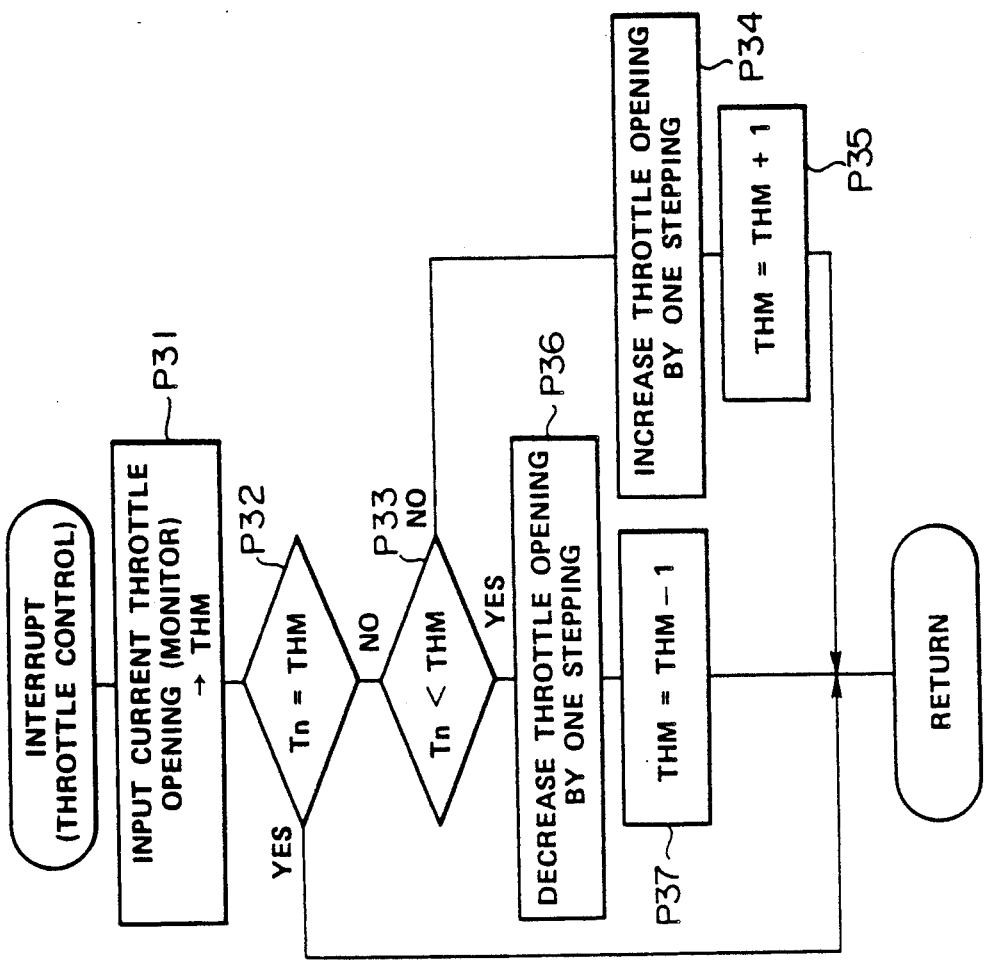

FIG. 4 (Slip Control by Engine)

FIG. 4 illustrates the slip control by the engine and corresponds to the step P10 shown in FIG. 3.

At step P21, an average driven wheel rotational speed SPR is computed by adding a rotational speed of the left-hand driven wheel 4 to that of the right-hand driven wheel 5 and then dividing the sum by 2.

Step P22 computes a target throttle opening Tn necessary for the average driven wheel rotational speed SPR to reach the target slip value ST (target rotational number WB) by means of the PI-PD control.

At step P23, it is judged whether or not the target throttle opening Tn computed at the step P22 is larger than the basic throttle opening $TO_B$ computed at the step P3 above. When NO at the step P23, on the one hand, the implementation of the slip control is required so that the flow advances to step P24 where the target throttle opening Tn computed at the step P22 is set intactly as a final target throttle opening Tn for the slip control. At step P25, the "High" signal indicative of the slip control being under way is output to the control unit $U_{AT}$.

When YES at the step P23, on the other hand, the basic throttle opening TOB is set as a final target throttle opening Tn for driving under ordinary conditions at step P26. And at step P27, the "Low" signal indicative of the slip control being not in the progress is output to the control unit $U_{AT}$.

Figure 5:
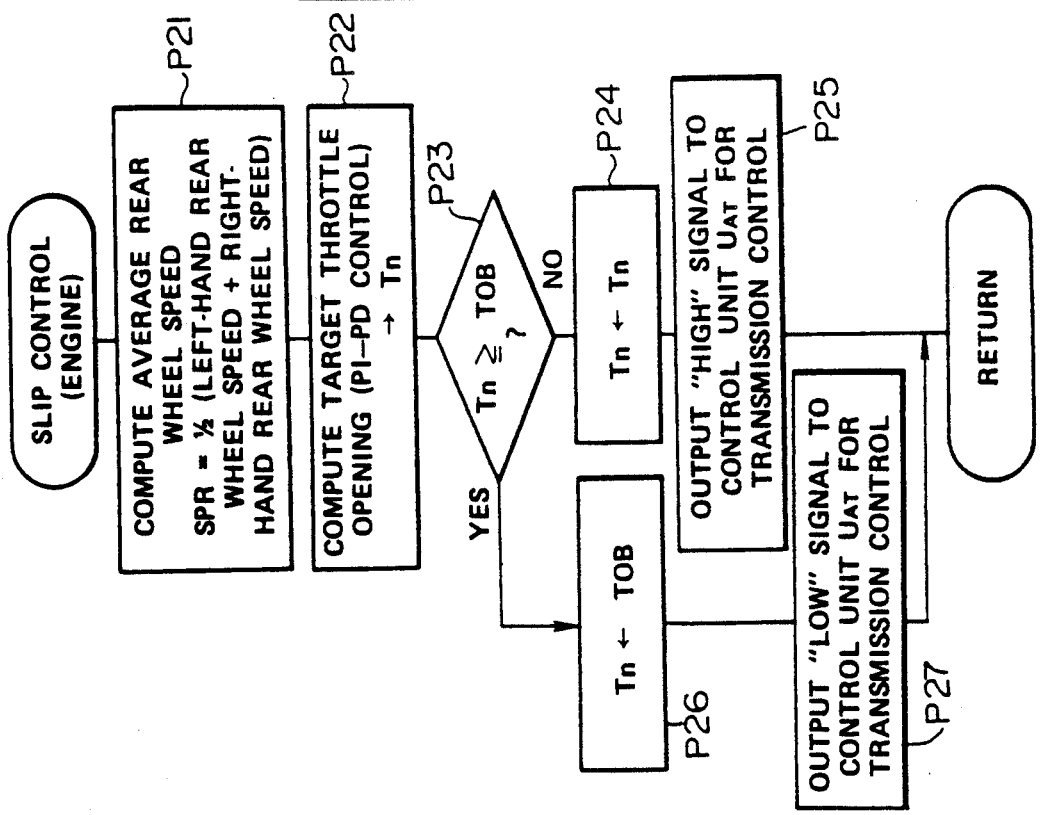

FIG. 5 (Throttle Control)

The flow chart shown in FIG. 5 may be designed to interrupt, for example, every 1 msec into the flow chart shown in FIG. 3. The processing in FIG. 5 is effected to realize the final target throttle opening Tn set at the step P24 or P25 in FIG. 4.

At step P31, the current throttle opening is read in from a monitor as the stepping number THM of the stepping motor as the throttle actuator 14.

At step P32, it is then judged whether or not the final target throttle opening Tn is equal to the current throttle opening THM. When YES at the step P32, no alteration of the throttle opening is required so that the control is finished.

When NO at the step P32, the flow proceeds to step P33 and it is judged therein whether the final target throttle opening Tn is smaller than the current throttle opening THM. If it is judged NO at the step P33, the throttle opening THM is increased by one stepping at step P34 and the stepping number THM is counted up by one at step P35, on the one hand, and, if YES at the step P33, it is decreased by one stepping at step P36 and the stepping number THM is counted down by one at step P37, on the other hand. The counts at steps P35 and P37 are then read in at the step P31.

Figure 6:
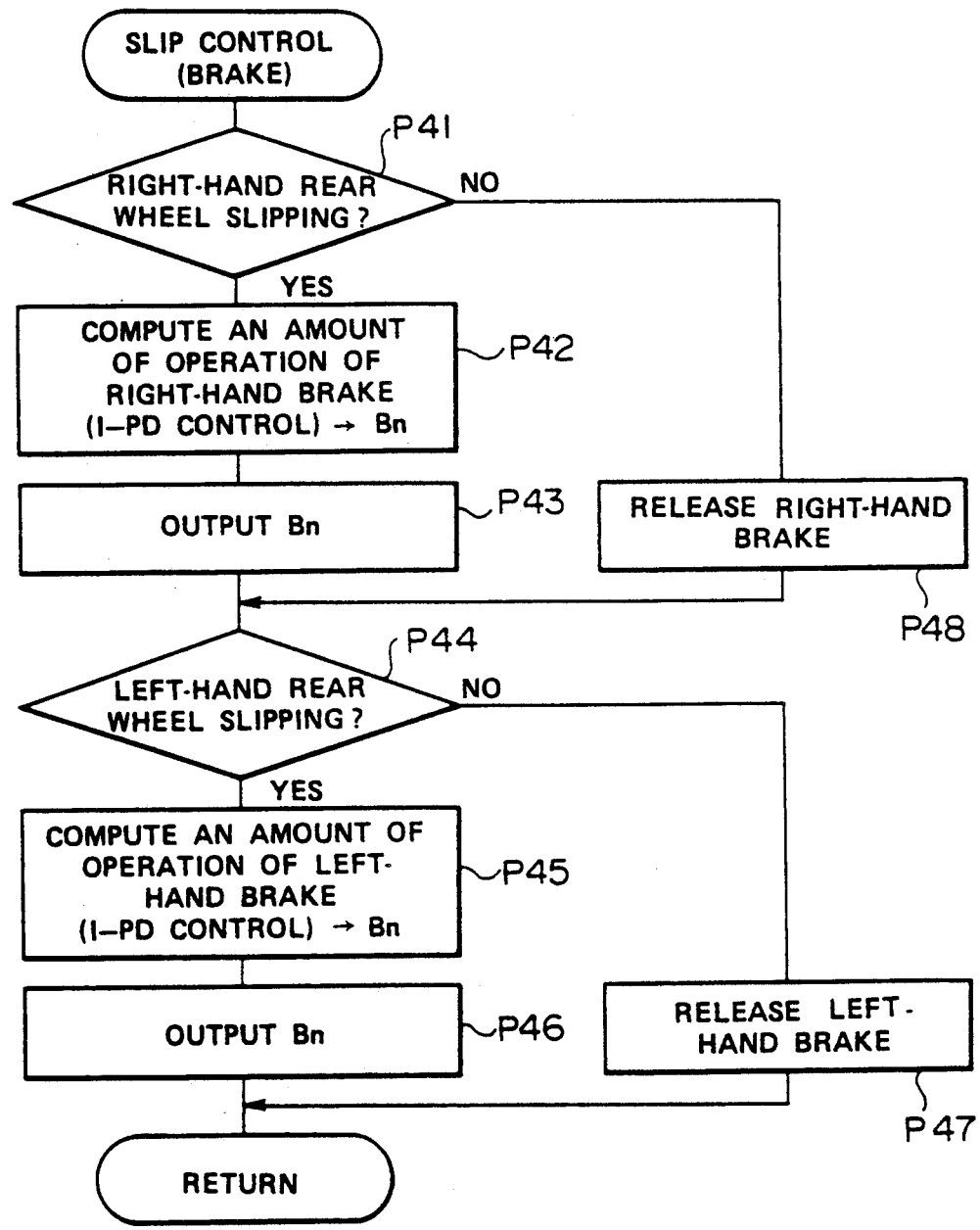

FIG. 6 (Slip Control by Brake)

FIG. 6 illustrates the slip control by the brake and corresponds to the step P11 in FIG. 3.

Step P41 judges whether or not a predetermined degree of slippage occurs on the right-hand driven rear wheel 5. More specifically, whether or not the slip ratio for the right-hand rear wheel is larger than 12.5% of the vehicle speed is judged at the step P41. If YES at the step P41, the flow advances to step P42 where the operation amount Bn of the right-hand brake operated by means of the I-PD control is computed. Then, at step P43, the operation amount Bn computed at the step P42 is output whereby the braking force in an amount corresponding to the output operation amount Bn is applied to the right-hand driven rear wheel 5. If it is judged NO at the step P41, the flow proceeds to step P48 where the right-hand brake is released.

After the steps P43 and P48, the flow proceeds to step P44 and it is judged therein whether or not a predetermined degree of slippage occurs on the left-hand driven rear wheel 4 in substantially the same manner as at the step P41. When YES at the step P44, on the one hand, the operation amount Bn of the left-hand brake operated by means of the I-PD control is computed at step P45 and the resulting operation amount Bn is output at step P46, whereby the braking force in an amount corresponding to the output operation amount Bn is applied to the left-hand driven rear wheel 5. When NO at the step P44, on the other hand, the left-hand brake is forced to be released at step P47.

Figure 7:
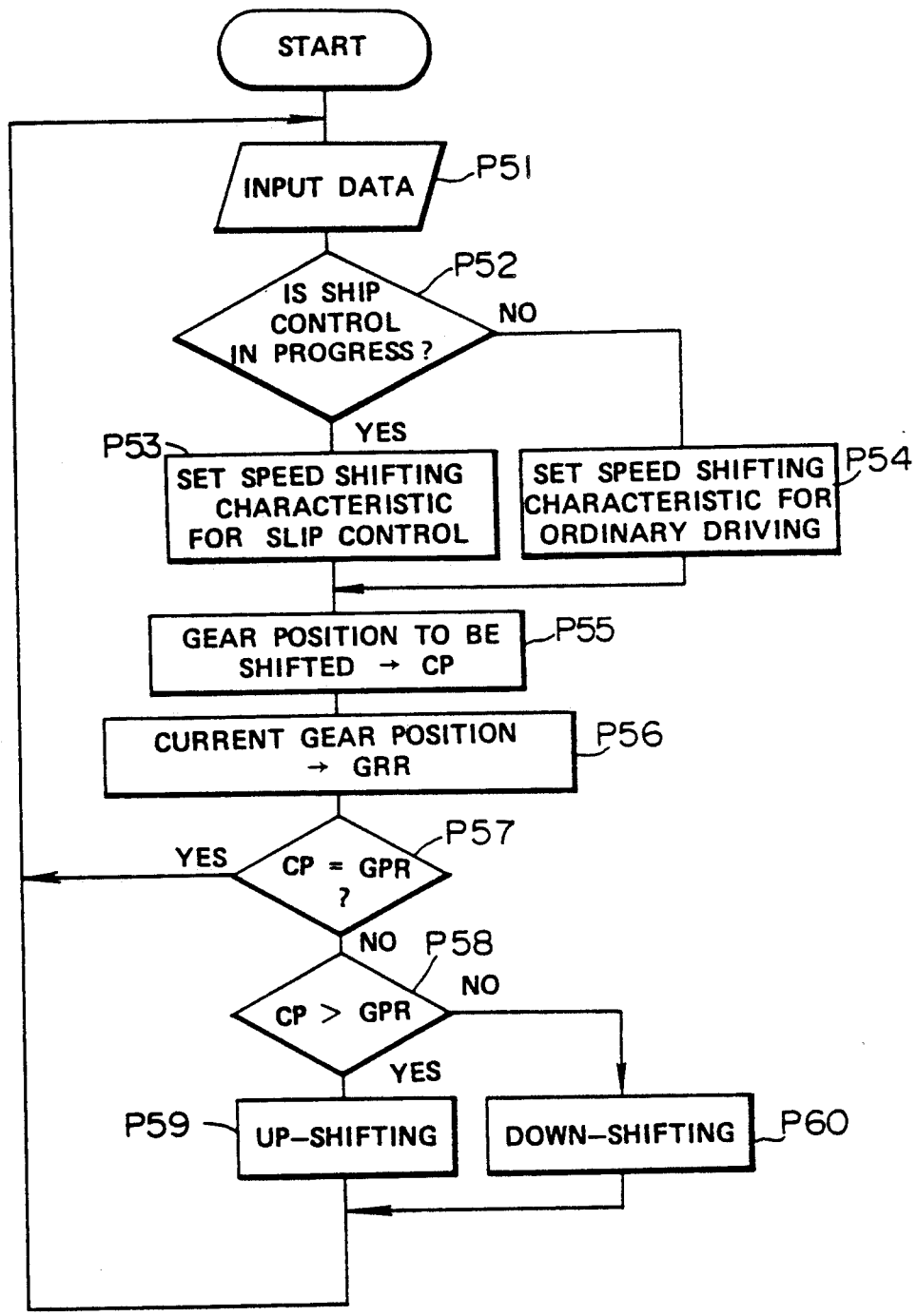

FIG. 7 (Shift Control)

The flowchart as shown in FIG. 7 is to process the interruption, for example, for every 20 msec.

At step P51, signals from the sensors 61, 71 and 72 and a signal of implementation of or failure to implement the control unit $U_S$ are read in. In other words, a "High" or "Low" signal at the respective steps P25 and P27 in FIG. 4 is input. Step P52 judges whether or not the slip control is under way, that is, whether or not the "High" signal is output at the step P25. If it is judged YES at the step P52, on the one hand, the second shift characteristic for the slip control as shown in FIG. 10 is set at step P53, and if NO at the step P52, on the other hand, the first shift characteristic for ordinary drive operation as shown in FIG. 9 is set at step P54. After the step P53 or P54, a gear position CP (speed stages) to be shifted is determined on the basis of the shift characteristic set at the step P53 or P54. Then at step P56, the current gear position GPR is set.

At step P57, it is judged whether or not the gear position CP coincides with the current gear position GPR.

When it is judged YES at step P57, on the one hand, no shift of speed stages is required so that the control is finished. When it is judged NO at the step P57, on the other, the flow advances to step P58 and it is then judged therein whether or not the gear position CP is larger than the current gear position GPR. If YES at the step P58, an output is given to the shift solenoid 73 at step P59 and the speed stages are shifted up. If NO at the step P58, an output is given to the shift solenoid 73 at step P60 in order to downshift the speed stages.

SECOND EMBODIMENT

FIG. 12 shows a second embodiment of the slippage preventing apparatus according to the present invention.

In this embodiment, it is to be noted that the speed stage is fixed as the one immediately before the start-up of the slip control for a predetermined period of time, for example, for 60 seconds, and the shift is made after the elapse of the predetermined period of time.

Given the foregoing, the flowchart shown in FIG. 12 will be described hereinbelow, provided that steps P56 to P60 in FIG. 12 are substantially the same as the steps P56 to P60 in FIG. 7 so that a description thereon will be omitted herein.

At step R11, there are input data which are substantially the same as in the step P51 in FIG. 7. And at step R12 is read in a target gear position TGP that follows the shift characteristic by referring to the map in FIG. 9 representing the first shift characteristic involved with ordinary drive operation.

At step R13, it is judged whether or not the slip control is currently in progress in substantially the same manner as at the step P52 in FIG. 7. If NO at the step R13, the target gear position TGP read in at the step R12 is set intactly as a final target gear position CP at step P14. Thereafter, the processing is effected at steps P56 to P60 in FIG. 12 to reach the target gear position CP by following the steps P56 to P60 in FIG. 7.

If YES at the step R13 and it is judged that the slip control is currently under way, it is further judged at step R20 whether or not the target gear position TGP at the step R12 is identical to the previous target gear position TGPL. If YES at the step R20, the flow proceeds to step R22 where a count value T of a timer for counting a period of time elapsed from the start-up of the slip control is counted up by one. Thereafter the processing of the steps P56 to P60 is effected. If NO at the step R20, it is then judged at step R23 whether or not the count value T for the timer is larger than 60 seconds. If NO at the step R21, the flow advances to the step R22 and subsequent steps which follow for further processing.

If YES at the step R21, it is judged that the slip control elapsed 60 seconds from the commencement of the slip control. At this time, the target gear position TGP set at the step R12 is set at step R23 as a final target gear position CP. And at step R24, the count value T for the timer is then reset to zero at step P25. Then at step R25, the target gear position TGP at the step R12 is renewed as the previous target gear position TGPL. The final target gear position CP is then processed by steps P56 to P60 in the same manner as have been described hereinabove.

THIRD EMBODIMENT

Figure 13:
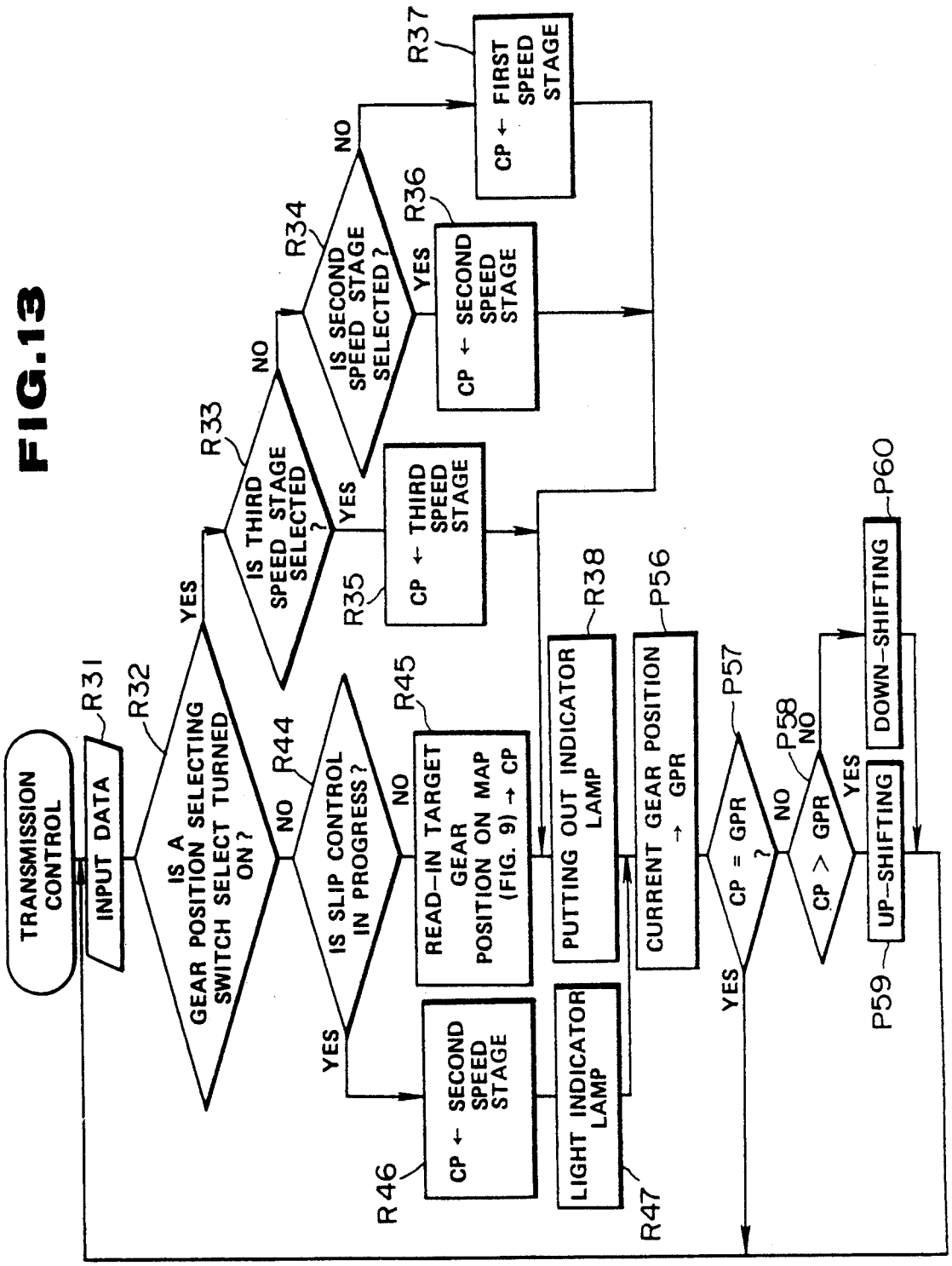

FIG. 13 relates to a third embodiment according to the present invention. In FIG. 13, steps P56 to P60 are substantially the same as shown in FIG. 7 so that a description thereon will be omitted herein for avoidance of duplicity.

In this embodiment, the gear position is fixed at the 2nd speed stage during the slip control being under way. As the the 2nd speed stage generally may cover a speed range from the start-up to a high speed range faster than 100 km per hour, then this gear position is considered appropriate for restricting the shift of speed stages during the slip control and further avoiding problems with the drive which may arise upon restriction over the shift of speed stages. In this embodiment, it is to be noted that an indicator 81 (a lamp as shown in FIG. 1) is provided in order to show the driver the fact that a particular shift characteristic for exclusive use during the slip control is adopted. In this embodiment, a gear position fixing switch 82 (shown in FIG. 1) is disposed to thereby select an arbitrary gear position from the 1st to 3rd speed stages via manual operation by the driver. The gear position selected by the switch 82 is kept on being fixed during operation of the switch 82 regardless of whether the slip control is under way.

Given the foregoing, a state of operation of the switch 82 is read in at step R31 in addition to the data as read in at the step P51 in FIG. 7. Then at step R32, it is judged whether or not the switch 82 is turned on. If YES at the step R32, the gear position selected by the switch 82 is set as the target gear position CP at steps R33 to R37. In other words, it is judged at step R33 whether or not the switch 82 selects a gear position for the 3rd speed stage. If YES at the step R33, the gear position for the 3rd speed stage is set at step R35 as the final target gear position CP. If NO at the step R33, it is then judged at step R34 whether or not the switch 82 selects a gear position for the 2nd speed stage. If YES at the step R34, the gear position selected by the switch 82 is set as the final target gear position CP at step R36. If NO at the step R34, the gear position for the 1st speed stage is set as the final target gear position CP at step R37.

After the steps R35, R36 and R37, the indicator lamp 81 is turned off at step R38 and then the processing following steps P56 to P60 is effected in the same manner as in FIG. 7.

If NO at the step R32, it is then judged at step R44 whether or not the slip control in progress. If NO at the step R44, the target gear position CP is read in at step R45 by referring to the shift characteristic shown in FIG. 9. Thereafter the processing of the steps P56 to P60 is effected in the same manner as above through the step R38 where the indicator lamp 81 is turned off in order to realize the target gear position CP read in at the step R45.

If YES at the step R44, the target gear position CP is set at the 2nd speed stage position at step R46. After the step R46, the indicator lamp 81 is turned on at step R47 and then the processing from the step P56 to the step P60 is effected to realize the gear position for the 2nd speed stage.

FOURTH EMBODIMENT

Figure 14:
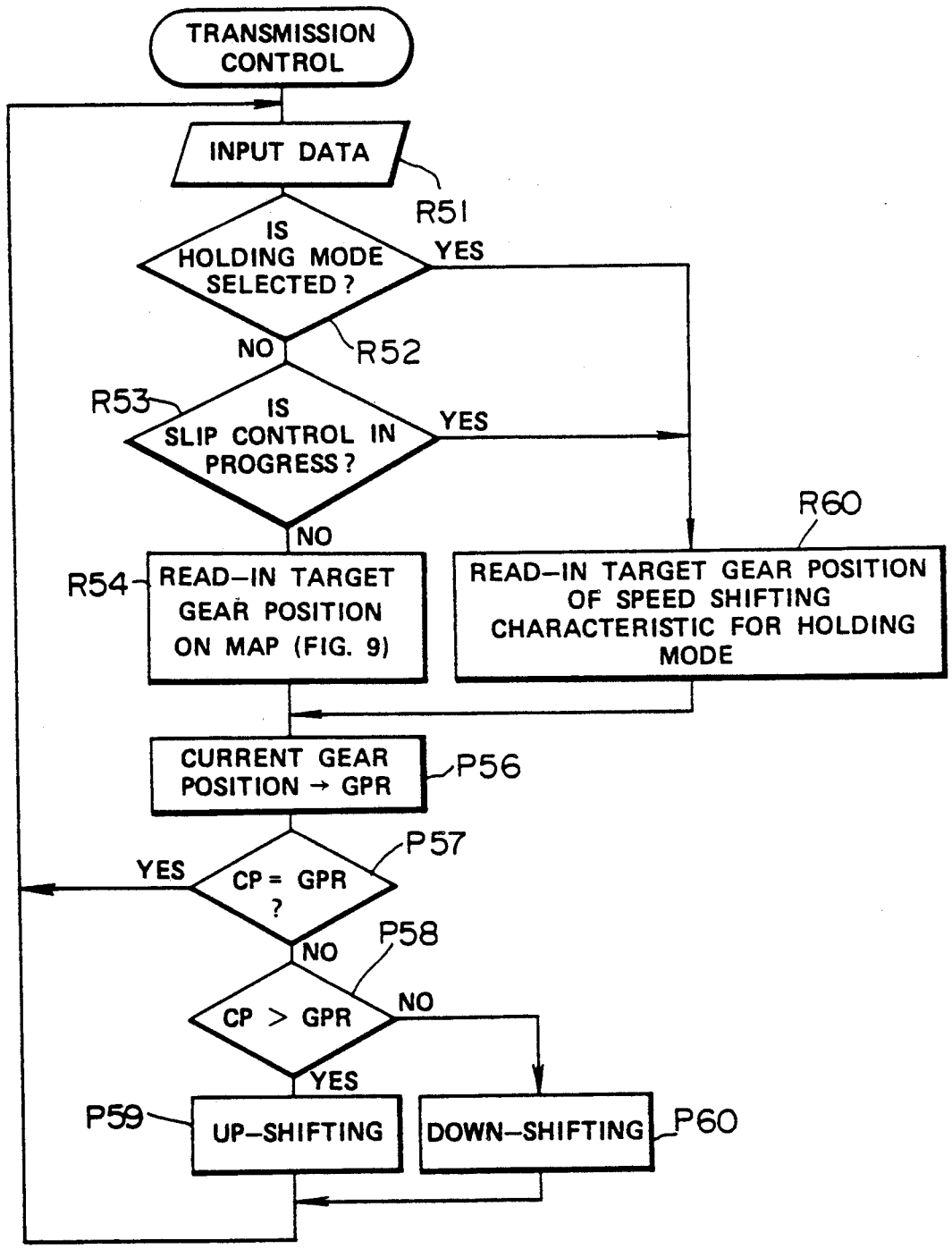
Figure 15:
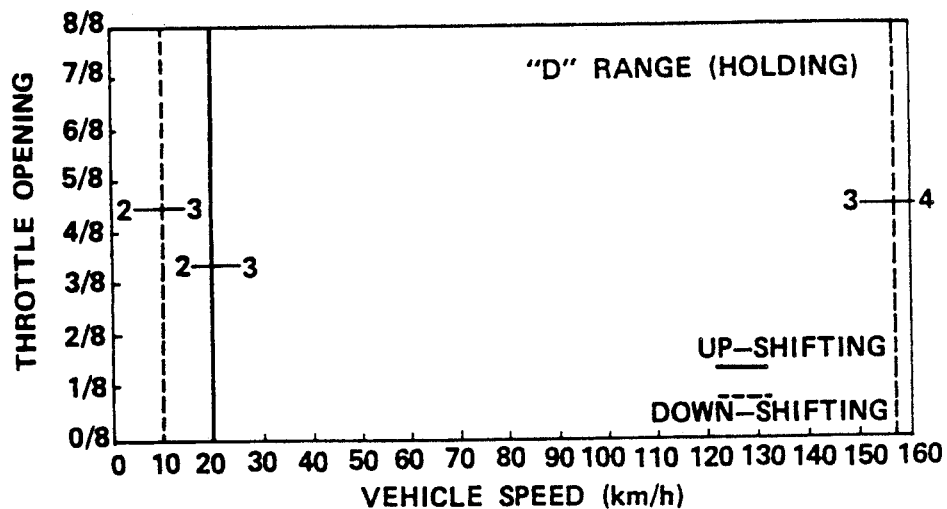
FIGS. 15 to 17 are graphs showing shift characteristics for holding mold.
Figure 16:
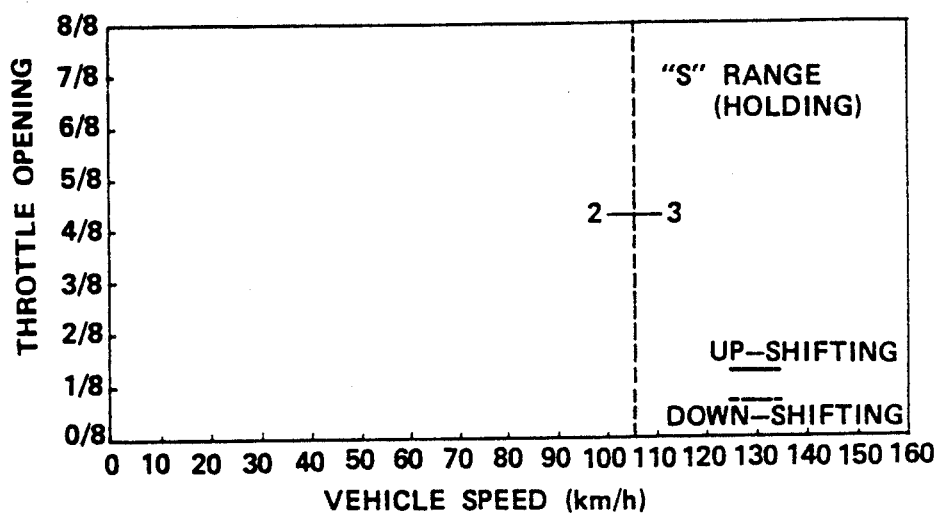
Figure 17:
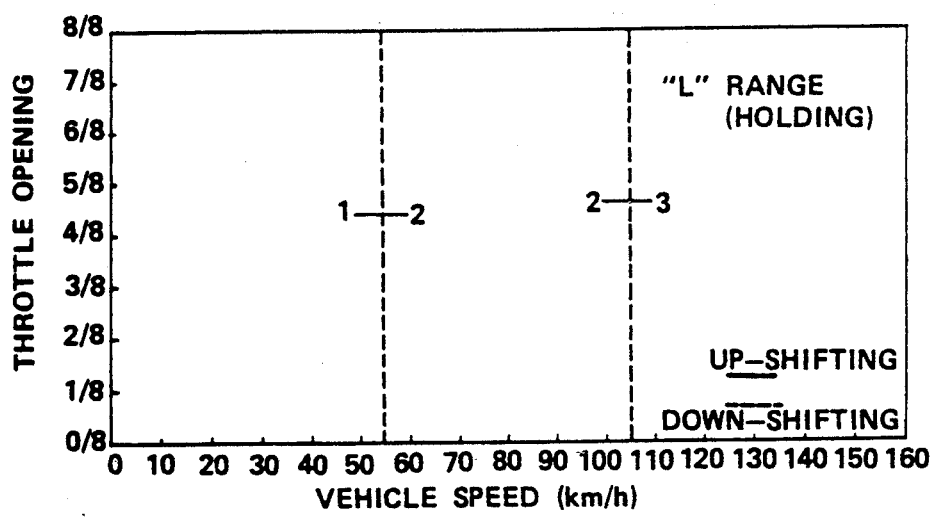
Figure 18:
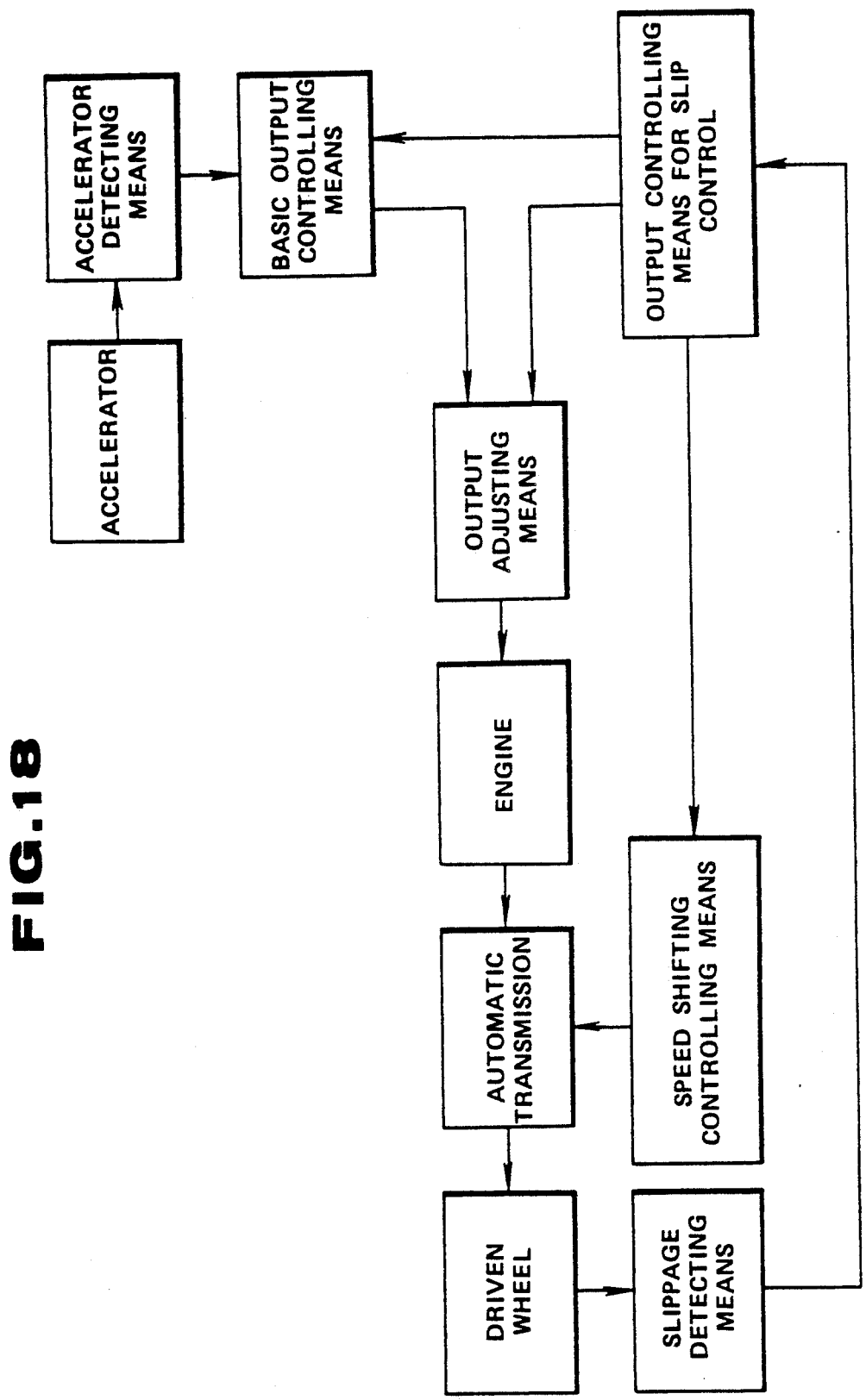
FIG. 18 is a block diagram showing the structure according to the present invention.

FIGS. 14 to 17 show a fourth embodiment according to the present invention. In this embodiment, there are selectively used a basic shift characteristic as shown in FIG. 9 and shift characteristics for a holding mode as shown in FIGS. 15 to 17. The shift characteristic for the holding mode may be selected by means of manual operation of a holding mode switch 83 (as shown in FIG. 1) by the driver. The speed stage is selected which follows the holding mode when the holding mode switch 83 is manually selected or during operation of the slip control. In other cases, the speed stage following the basic shift characteristic is selected. It is to be noted herein that, when the holding mode is selected, that is, for example, when a selection lever is held at the "D" range position, the shift characteristic as shown in FIG. 15 may be selected; when the selection lever is held at the "S" range position, the shift characteristic as shown in FIG. 16 may be selected; and when the lever is held at the "L" range position, the shift characteristic as shown in FIG. 17 may be selelcted. These shift characteristics are set each using only the vehicle speed as a parameter.

The automatic transmission with such a holding mode is known so that a further description will be omitted herein.

Referring now to FIG. 14, at step R51, there are read in a state of operation of the holding mode switch 83 as well as data in the same manner as at the step P41 in FIG. 4. At step R52, it is judged whether or not the holding mode is selected, that is, whether or not the holding mode switch 83 is turned on. If YES at the step R52, the flow advances to step R60 and then the shift characteristic for the holding mode is selected from the shift characteristics as shown in FIGS. 15 to 17 on the basis of the "D", "S" or "L" range position and the target gear position CP is set in accordance with the shift characteristic selected at the step R60. The steps P56 to P60 are then processed until the target gear position CP is realized.

If NO at the step R52, it is then judged whether or not the slip control is currently in progress at step R53. If YES at the step R53, the flow proceeds to the step R60 and the same proceeding as have been described hereinabove is repeated to provide the shift following the shift characteristic for the holding mode. If NO at the step R53, the target gear position CP is read in according to the basic shift characteristic as shown in FIG. 9.

Although the foregoing embodiments relate to those where the torque to be applied to the driven wheels is adjusted by a control over both the engine output and the braking force by the brake, it is to be understood that the slip control can be conducted using adjustment of the engine output only. It is further understood that the engine output may be adjusted using changes in air-fuel ratios, ignition timings, supercharging pressures or the like or alterations in the number of operating cylinders.

It is to be understood that the foregoing text and drawings relate to embodiments of the present invention given by way of examples but not limitation. Various other embodiments and variants are possible within the spirit and scope of the present invention.

What is claimed is:

1. A slippage preventing apparatus for a vehicle in which an output of an engine is transmitted to a driven wheel through an automatic transmission, comprising:
   an output adjusting means for adjusting the output of an engine;
   a slippage detecting means for detecting the degree of slippage of the driven wheel;
   an accelerator operation detecting means for detecting the degree of operation of the accelerator;
   a basic output controlling means for controlling said output adjusting means in accordance with an output from said accelerator operation detecting means;
   an output controlling means for controlling the output of the engine, so as to reduce the output of the engine when the output from said slippage detecting means exceeds a predetermined amount representing a slippage condition, by controlling said output adjusting means prior to the basic output controlling means;
   a shifting controlling means for controlling the shifting of the automatic transmission so as to reduce the likelihood of shifting occurring when a slippage condition is detected, said shift controlling means controlling the shift of speed stages of the automatic transmission based on a shifting characteristic, said shifting controlling means including:
   a first storing means for storing a first shifting characteristic using the output of the engine and the vehicle speed as parameters;
   a second storing means for storing a second shifting characteristic using only the vehicle speed as a parameter;
   a first selecting means for selecting the first shift characteristic during ordinary driving conditions and for selecting the second shifting characteristic when a slippage condition is detected; and
   a shifting instruction means for instructing the shifting of the automatic transmission to a speed stage corresponding to the shifting characteristic selected by the first selecting means.

2. A slippage preventing apparatus as claimed in claim 1, further comprising:
   a second selecting means for selecting a holding mode, said second selecting means being manually operable;
   wherein the first selecting means selects the second shifting characteristic when the second selecting means selects the holding mode.

3. A slippage preventing apparatus for a vehicle in which output of an engine is transmitted to a driven wheel through an automatic transmission, comprising:
   an output adjusting means for adjusting the output of an engine;
   a slippage detecting means for detecting the degree of slippage of the driven wheel based on a rotational speed of the driven wheel and a rotational speed of the undriven wheel;
   an accelerator operation detecting means for detecting the degree of operation of the accelerator;
   a basic output controlling means for controlling said output adjusting means in accordance with an output from said accelerator operation detecting means;
   an output controlling means for controlling the output of the engine, so as to reduce the output of the engine when the output from said slippage detecting means exceeds a predetermined amount representing a slippage condition, by controlling said output adjusting means prior to the basic output controlling means, said output controlling means including:
   a determining means for determining a slippage control value in accordance with a given target value;
   a judgment means for judging whether said slippage control value has reached a value so as to reduce the output of the engine by comparing a slippage control value with said basic control value and generating an output based thereon;
   a control value selecting means for selecting said slippage control value for said output adjusting means prior to said basic control value of said basic output controlling means in response to an output from said judgment means; and
   a shifting controlling means for controlling the shifting of the automatic transmission so as to reduce the likelihood of shifting occurring when a slippage condition is detected, said shift controlling means controlling the shift of speed stages of the automatic transmission based on a shifting characteristic which uses the output of the engine and a vehicle speed as parameters when the vehicle is driven under ordinary driving conditions, and wherein said shift controlling means controls the shift of speed stages by reducing the output of the engine when a slippage condition is detected.

4. A slippage preventing apparatus as claimed in claim 3, wherein the output adjusting means is a throttle valve for adjusting an amount of intake air into the engine.

5. A slippage preventing apparatus as claimed in 3, further comprising:
   a braking force adjusting means for adjusting a braking force to the driven wheel; and
   a slippage control means for controlling a slippage by applying the braking force to the driven wheel by controlling the braking force adjusting means in response to an output from the slippage detecting means when the degree of slippage of the driven wheels exceeds a predetermined amount.

6. A slippage preventing apparatus as claimed in claim 5, wherein the control means prohibits shifting for a predetermined time period during a slippage condition.

7. A slippage preventing apparatus as claimed in claim 5, wherein the control means fixes the automatic transmission to a given speed stage during a slippage condition.

8. A slippage preventing apparatus as claimed in claim 7, wherein the given speed stage is a speed stage immediately prior to detecting of a slippage condition.

9. A slippage preventing apparatus as claimed in claim 7 wherein the given speed stage is a second speed stage.

10. A slippage preventing apparatus as claimed in claim 7, wherein the given speed stage is manually selected.

11. A slippage preventing apparatus as claimed in claim 3, wherein the shifting controlling means provides a speed stage for slippage control when a slippage condition is detected, prior to a speed stage set on the basis of the shifting characteristic; and further comprising a display means for displaying the speed stage for slippage control.

12. A slippage preventing apparatus for a vehicle in which an output of an engine is transmitted to a driven wheel through an automatic transmission, comprising:

an output adjusting means for adjusting the output of an engine;

a slippage detecting means for detecting the degree of slippage of the driven wheel;

an accelerator operation detecting means for detecting the degree of operation of the accelerator;

a basic output controlling means for controlling said output adjusting means in accordance with an output from said accelerator operation detecting means;

an output controlling means for controlling the output of the engine, so as to reduce the output of the engine when the output from said slippage detecting means exceeds a predetermined amount representing a slippage condition, by controlling said output adjusting means prior to the basic output controlling means;

a shifting controlling means for controlling the shifting of the automatic transmission so as to reduce the likelihood of shifting occurring when a slippage condition is detected, said shift controlling means controlling the shift of speed stages of the automatic transmission based on a shifting characteristic which uses the output of the engine and a vehicle speed as parameters when the vehicle is driven under ordinary driving conditions, and wherein said shift controlling means controls the shift of speed stages by reducing the output of the engine when a slippage condition is detected, said shifting controlling means controlling the automatic transmission to shift its speed stage to a speed stage for slippage control prior to a speed stage based on said shifting characteristic when a slippage condition is detected; and a display means for displaying said speed stage for slippage control.

13. A slippage preventing apparatus for a vehicle in which an output of an engine is transmitted to a driven wheel through an automatic transmission, comprising:

an output adjusting means for adjusting the output of an engine, said output adjusting means including a slippage control value determining means for determining a slippage control value in accordance with a predetermined target slippage amount;

a slippage detecting means for detecting the degree of slippage of the driven wheel based on a rotational speed of the driven wheel and a rotational speed of an undriven wheel;

an accelerator operation detecting means for detecting the degree of operation of the accelerator;

a basic output controlling means for controlling said output adjusting means in accordance with an output from said accelerator operation detecting means;

an output controlling means for controlling the output of the engine, so as to reduce the output of the engine when the output from said slippage detecting means exceeds a predetermined amount representing a slippage condition, by controlling said output adjusting means prior to the basic output controlling means;

a shifting controlling means for controlling the shifting of speed stages of the automatic transmission, in accordance with a shifting characteristic using the degree of operation of the accelerator and a vehicle speed as parameters, so as to reduce the likelihood of shifting occurring when a slippage condition is detected;

a generating means for generating an output when said slippage control value reaches a value so as to reduce the output of the engine determined by comparing said slippage control value with said basic control value; and a control value selecting means for selecting said slippage control value for said output adjusting means prior to a basic control value of said basic output controlling means in response to an output from said judgment means.

14. A slippage preventing apparatus for a vehicle in which an output of an engine is transmitted to a driven wheel through an automatic transmission, comprising:

an output adjusting means for adjusting the output of an engine;

a slippage detecting means for detecting the degree of slippage of the driven wheel;

an accelerator operation detecting means for detecting the degree of operation of the accelerator;

a basic output controlling means for controlling said output adjusting means in accordance with an output from said accelerator operation detecting means;

an output controlling means for controlling the output of the engine, so as to reduce the output of the engine when the output from said slippage detecting means exceeds a predetermined amount representing a slippage condition, by controlling said output adjusting means prior to the basic output controlling means; and a shifting controlling means for controlling the shifting of the automatic transmission so as to reduce the likelihood of shifting occurring when a slippage condition is detected, said shift controlling means controlling the shift of speed stages of the automatic transmission based on a shifting characteristic which uses the output of the engine and a vehicle speed as parameters when the vehicle is driven under ordinary driving conditions, and wherein said shift controlling means fixes the shift of speed stages at a predetermined speed stage during a slippage condition, wherein said predetermined speed stage is set as a second speed stage.

15. A slippage preventing apparatus for a vehicle in which an output of an engine is transmitted to a driven wheel through an automatic transmission, comprising:

an output adjusting means for adjusting the output of the engine;

a slippage detecting means for detecting the degree of slippage of the driven wheel, said slippage detecting means generating a first output signal when the driven wheel slips a small amount and a second output signal when the driven wheel slips a large amount;

an accelerator operation detecting means for detecting the degree of operation of the accelerator;

a basic output controlling means for controlling the output adjusting means in accordance with an output from the accelerator operation detecting means;

an output controlling means for controlling an output for slippage control to reduce the output of the engine via the output adjusting means prior to the basic output adjusting means upon receiving said second output signal indicating a slippage condition;

a first storing means for storing a shifting characteristic for ordinary running;

a second storing means for storing a shifting characteristic for slippage control;

a shifting characteristic selecting means for selecting the first shifting characteristic upon receiving said first output signal and for selecting the second shifting characteristic upon receiving said second output signal; and a shifting instruction means for instructing the shifting of the automatic transmission to a speed stage corresponding to a shifting characteristic selected by said shifting characteristic selecting means.

16. A slippage preventing apparatus as claimed in claim 15, wherein said output adjusting means is a throttle valve for adjusting an amount of intake air into the engine.

17. A slippage preventing apparatus as claimed in claim 15, further comprising:
    a braking force adjusting means for adjusting a braking force to the driven wheel; and
    a slippage control means for controlling slippage by applying the braking force to the driven wheel by controlling the braking force adjusting means in response to said second output signal.

18. A slippage preventing apparatus as claimed in claim 15, wherein said slippage detecting means detects slippage on the basis of a rotational velocity of the driven wheel and a rotational velocity of the undriven wheel.

19. A slippage preventing apparatus as claimed in claim 18, wherein said slippage control means operates as a feedback control over the output adjusting means so that the degree of slippage reaches a given target degree of slippage.

20. A slippage preventing apparatus as claimed in claim 15, wherein said second shifting characteristic is set to achieve a single predetermined speed stage.

21. A slippage preventing apparatus as claimed in claim 20, wherein single predetermined speed stage is a speed stage immediately after a slippage condition is detected.

22. A slippage preventing apparatus for a vehicle having driven and undriven wheels in which an output of an engine is transmitted to a driven wheel through an automatic transmission, comprising:
    an output adjusting means for adjusting the output of the engine;
    a slippage detecting means for detecting a degree of slippage of the driven wheel;
    an accelerator operation detecting means for detecting a degree of operation of the accelerator;
    a basic output controlling means for controlling the output adjusting means via a basic control value set in response to an output from said accelerator operation detecting means;
    a slippage control means for controlling the amount of slippage by generating a control value for slippage control so as to reduce the output of the engine when said degree of slippage is greater than a predetermined amount representing a slippage condition;
    a control value selecting means for selecting said control value for slippage control prior to the basic control value when said control value for slippage control is a value that will reduce the output of the engine by comparing said control value for slippage control with said basic control value; and
    a shifting control means for controlling the shifting of the automatic transmission based on a shifting characteristic which uses the output of the engine and a vehicle speed as parameters when the vehicle is driven under ordinary driving conditions, and wherein said shift controlling means controls the shifting of the automatic transmission by reducing the output of the engine when said control value selecting means selects said control value for slippage control.

23. A slippage preventing apparatus as claimed in claim 22, wherein said output adjusting means is a throttle valve for adjusting the amount of intake air into the engine.

24. A slippage preventing apparatus as claimed in claim 23, further comprising:
    a braking force adjusting means for adjusting a braking force to the driven wheel; and
    a slippage control means for controlling slippage by applying the braking force to the driven wheel by controlling the braking force adjusting means when a slippage condition is detected.

25. A slippage preventing apparatus as claimed in claim 22, wherein said slippage detecting means detects the degree of slippage based on a rotational velocities of the driven wheels and a rotational velocities of the undriven wheels.

26. A slippage preventing apparatus as claimed in claim 22, wherein said shifting control means is set to prohibit shifting of the automatic transmission when a slippage condition is detected.

27. A slippage preventing apparatus as claimed in claim 26, wherein said shifting control means prohibits the shifting of the automatic transmission for a given period of time after a slippage condition is detected.

28. A slippage preventing apparatus as claimed in claim 26, wherein said shifting control means fixes the automatic transmission to a given speed stage when a slippage condition is detected.

29. A slippage preventing apparatus as claimed in claim 28, wherein said given speed stage is a speed stage immediately after a slippage condition is detected.

30. A slippage preventing apparatus as claimed in claim 28, wherein said given speed stage is manually selected.

31. A slippage preventing apparatus as claimed in claim 22, wherein said shifting control means is set to provide a speed stage for slippage control prior to a speed stage based on the shifting characteristic when a slippage condition is detected; and
    further comprising a display means for displaying said speed stage for slippage control.

32. A slippage preventing apparatus as claimed in claim 22, wherein said shifting control means controls the shifting of the automatic transmission in accordance with a second shifting characteristic which uses the degree of operation of the accelerator and the vehicle speed as parameters.

33. A slippage preventing apparatus as claimed in claim 32, wherein said output adjusting means is a throttle valve for adjusting an amount of intake air into the engine.

34. A slippage preventing apparatus as claimed in claim 33, further comprising:
   a braking force adjusting means for adjusting a braking force to the driven wheel; and
   a slippage control means for controlling slippage by applying the braking force to the driven wheel by controlling the braking force adjusting means when a slippage condition is detected.

35. A slippage preventing apparatus as claimed in claim 32, wherein said slippage detecting means detects the degree of slippage based on a rotational velocities of the driven wheels and a rotational velocities of the undriven wheels.

36. A slippage preventing apparatus as claimed in claim 35, wherein said slippage control means operates as a feedback control over the output adjusting means so that the degree of slippage reaches a given target degree of slippage.

37. A slippage preventing apparatus as claimed in claim 35, further comprising:
   a determining means for determining a slippage control value in accordance with a given target value;
   a generating means for generating an output when said slippage control value reaches a value so as to reduce the output of the engine determined by comparing said slip control value with said basic control value;
   a control value selecting means for selecting said slippage control value for said output adjusting means prior to a basic control value of said basic output controlling means in response to an output from said generating means.

38. A slippage preventing apparatus for a vehicle having driven and undriven wheels in which an output of an engine is transmitted to a driven wheel through an automatic transmission, comprising:
   an output adjusting means for adjusting the output of the engine;
   a slippage detecting means for detecting the degree of slippage of the driven wheel;
   an accelerator operation detecting means for detecting the degree of operation of the accelerator;
   a basic output controlling means for controlling the output adjusting means via a basic control value corresponding to an output from said accelerator operation detecting means;
   a determining means for determining a control value for slippage control in accordance with a predetermined target degree of slippage;
   a control value selecting means for selecting said control value for slippage control prior to said basic control value when said control value for slippage control is a value that will reduce the output of the engine by comparing said control value for slippage control with said basic control value; and
   a shifting control means for controlling the shifting of the automatic transmission on the basis of a shifting characteristic which uses the output of the engine and a vehicle speed as parameters and for regulating the shifting of the automatic transmission by reducing the output of the engine when the control value selecting means selects the control value for slippage control.

39. A slippage preventing apparatus as in claim 38, wherein the output adjusting means is a throttle valve for adjusting an amount of intake air into the engine.

40. A slippage preventing apparatus as in claim 39, further comprising:
   a braking force adjusting means for adjusting a braking force to the driven wheel; and
   a slippage control means for controlling slippage by applying the braking force to the driven wheel by controlling the braking force adjusting means when said degree of slippage exceeds a predetermined amount representing a slippage condition.

41. A slippage preventing apparatus as claimed in claim 38, wherein said slippage detecting means detects the degree of slippage based on a rotational velocities of the driven wheels and a rotational velocities of the undriven wheels.

42. A slippage preventing apparatus as claimed in claim 38, wherein said shifting control means is set to prohibit shifting of the automatic transmission during a slippage condition.

43. A slippage preventing apparatus as claimed in claim 42, wherein said shifting control means prohibits the shifting for a given time period from start of the slippage condition.

44. A slippage preventing apparatus as claimed in claim 42, wherein said shifting control means fixes the automatic transmission to a given speed stage during a slippage condition.

45. A slippage preventing apparatus as claimed in claim 44, wherein said given speed stage is a speed stage immediately after the start of the slippage condition.

46. A slippage preventing apparatus as claimed in claim 44, wherein said given speed stage is selected manually.

* * * * *